United States Patent [19]

Saitoh et al.

[11] Patent Number: 4,636,081
[45] Date of Patent: Jan. 13, 1987

[54] APPARATUS FOR READING COLOR IMAGE

[75] Inventors: Hiroyuki Saitoh; Masami Kurata; Takashi Omori, all of Ebina, Japan

[73] Assignee: Fuji Xerox Co., Ltd., Tokyo, Japan

[21] Appl. No.: 641,491

[22] Filed: Aug. 16, 1984

[30] Foreign Application Priority Data

Aug. 17, 1983 [JP] Japan ................................ 58-149911

[51] Int. Cl.⁴ .............................................. G01J 3/50
[52] U.S. Cl. .................................. 356/402; 356/404; 356/420
[58] Field of Search ............... 356/402, 408, 404, 420, 356/425

[56] References Cited

FOREIGN PATENT DOCUMENTS 2507162 9/1975 Fed. Rep. of Germany ...... 356/425

Primary Examiner—Vincent P. McGraw
Attorney, Agent, or Firm—Spensley Horn Jubas & Lubitz

[57] ABSTRACT

In an apparatus for reading a color image on an original wherein the color image is illuminated and scanned by light from a plurality of light sources each having different spectrum to discriminate color of the color image on the basis of the reflected light from the original, these plurality of light sources are driven by a driving signal which is produced in synchronism with original read scanning.

9 Claims, 6 Drawing Figures

APPARATUS FOR READING COLOR IMAGE

BACKGROUND OF THE INVENTION

1. Field of the Invention

This invention relates to an apparatus for reading color image on an original, and particularly to apparatus for photoelectrically reading color information on an original by employing a plurality of light sources having different properties from one another.

2. Description of the Prior Art

A method for photoelectrically reading color image, i.e., color information on an original which has recently attracted public attention comprises steps of sequentially lighting a plurality of light sources having different spectral properties synchronized with the scanning of the original to produce a plurality of picture signals with respect to each scanning line of the original, and discriminating colors of the image on the basis of the levels of these picture signals.

Such method for reading color image will be described hereinbelow by referring to FIGS. 1 through 3. As an example, a method for producing three kinds of color picture signals of "blue", "red" and "black" by employing two fluorescent lamps of blue and red lamps is described.

Referring to FIG. 1, a blue fluorescent lamp 1 and a red fluorescent lamp 2 are lit by means of a lighting circuit (not shown) and the same portion (lines) of an original MS is illuminated by either blue light BC emitted from the blue fluorescent lamp 1 or red light RC from the red fluorescent lamp 2. The reflected light from the original MS is focussed upon an image sensor 4 comprising, for example, a CCD (charge coupled device) line sensor by means of a lens 3, where it is converted into an electric signal (photoelectric conversion signal CE) having a level corresponding to a quantity of the focused light. In this case, for example, calcium tungstate is used as fluorescent substance of the blue fluorescent lamp 1, while, for example, magnesium germanate is employed as fluorescent substance of the red fluorescent lamp 2. FIG. 2 shows spectral properties of both the blue and red fluorescent lamps 1 and 2.

In this conventional method for reading color image, the blue fluorescent lamp 1 and the red fluorescent lamp 2 are alternately lit synchronized with the scanning of the original so that the reading are made twice for the same line of the original MS each time when the blue and red fluorescent lamps 1 and 2 are lit.

FIGS. 3(a) to 3(d) are timing charts for showing driving modes of this conventional method for reading color image, wherein FIG. 3(a) shows reading and scanning of an original MS by means of the image sensor 4, FIG. 3(b) shows the generate manner of the blue light BC, i.e., the manner of turning on and off the blue fluorescent lamp 1, FIG. 3(c) shows the generating manner of the red light RC, i.e., the manner of turning on and off the red fluorescent lamp 2, and FIG. 3(d) shows photoelectric conversion signals CE outputted from the image sensor 4 in response to the reading and scanning. In FIGS. 3(a) to 3(d), the first line of the original MS consists of blue images (i.e. blue line), whilst the second line consists of red images (i.e. red line).

In the case when the blue light BC is projected during a first scanning period of time (period of time $t_1$ to time $t_2$) on the first line of the original MS as shown in FIG. 3(b), the electric charge corresponding to the reflected light during the above scanning period of time (The maximum reflected light can be obtained under this condition and which is referred to as "100% reflected light".) is stored in the image sensor 4, and the charge thus stored is outputted from the image sensor 4 as the photoelectric conversion signal CE during the following scanning period (period of time $T_2$ to time $t_3$) (see FIG. 3(d)). Then, the second scanning is effected with respect to the same first line of the original MS during the period of time $t_2$ to time $t_3$. During this scanning period, the blue light BC is turned off and the red light RC is projected in place of the blue light BC as shown in FIGS. 3(b) and 3(c). The red light RC in this case is substantially absorbed by the blue images on the first line of the original MS (see FIG. 2). Accordingly, small amount of light is reflected and therefore the photoelectric conversion signal CE outputted from the image sensor 4 during the following scanning period (period of time $t_3$ to time $t_4$) are small as shown in FIG. 3(d). During scanning periods of time $t_4$ to time $t_5$ and time $t_5$ to time $t_6$, the second line (red line) is scanned. In this case, photoelectric conversion signal CE becomes opposite to reverse mode, the case of scanning the first line (blue line) (see FIG. 3(d)). In the case when scanning is effected by the image sensor 4 with respect to a white line, substantially 100% reflected light can be obtained for both the blue light BC and the red light RC. In this case, the photoelectric conversion signals CE become of a high level in response to the 100% reflected light. On the contrary, in the case when scanning operations are effected with respect to a black line, both the blue light BC and the red light RC are absorbed so that the resulting photoelectric conversion signals CE become of a low level.

In the color discriminating circuit 5 in FIG. 1, level discrimination of the photoelectric conversion signals CE is carried out per picture element, and colors of an image on the original MS are successively discriminated on the basis of a combination of varied cases such as above cases.

In the color image reading apparatus described above, however, signals of high frequency waves (sinusoidal waves) ranging from 10 to several tens of KHz were used for lighting the fluorescent lamps. For this reason, there was a great switching loss in the lighting circuit due to repetition of blinking (i.e. turning on and off) of lamps, causing the lowered lighting efficiency of these fluorescent lamps. Besides, due to the high frequency blinking as described above, there was a demerit that light intensity distribution is uneven because light emittance becomes weak in the vicinity of electrodes of these fluorescent lamps.

Accordingly, an object of this invention is to provide a color image reading apparatus in which, when reading the color image by blinking sequentially a plurality of light sources of different spectral characteristics light sources are caused to blink with a high efficiency, thereby both reading precision and reading speed are greatly improved.

SUMMARY OF THE INVENTION

According to the present invention, light sources are caused to be driven in synchronism with the scanning period of original reading operation. That is, as a signal for driving the light sources, in place of high frequency signal as in the conventional case, a pulse signal of low frequency is used. This pulse signal is in operable level for only the time duration which corresponds to the time duration of original read scanning period by the image sensor and is supplied to each light source so that these light sources are sequentially lighted.

DETAILED DESCRIPTION OF PREFERRED EMBODIMENT

Figure 1:
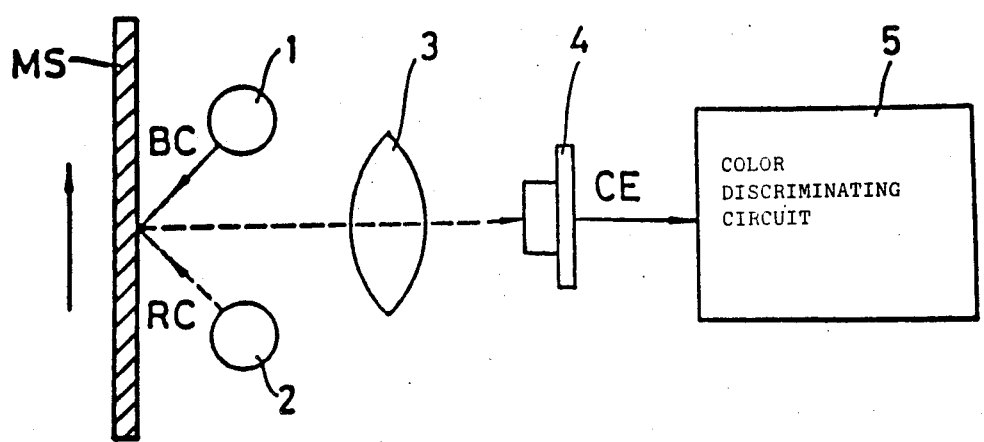
FIG. 1 shows configuration of a conventional color image reading apparatus.
Figure 2:
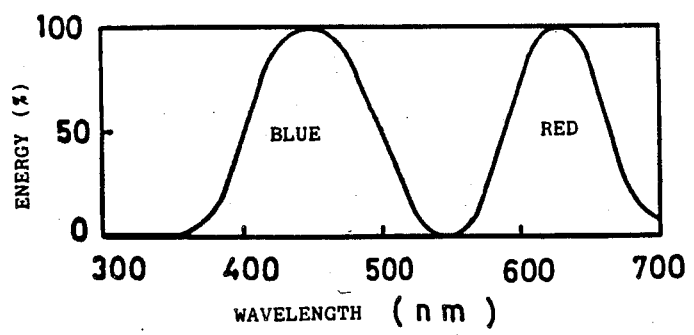
FIG. 2 is a graph showing spectrum of light emitted by blue and red fluorescent lamps.
Figure 4:
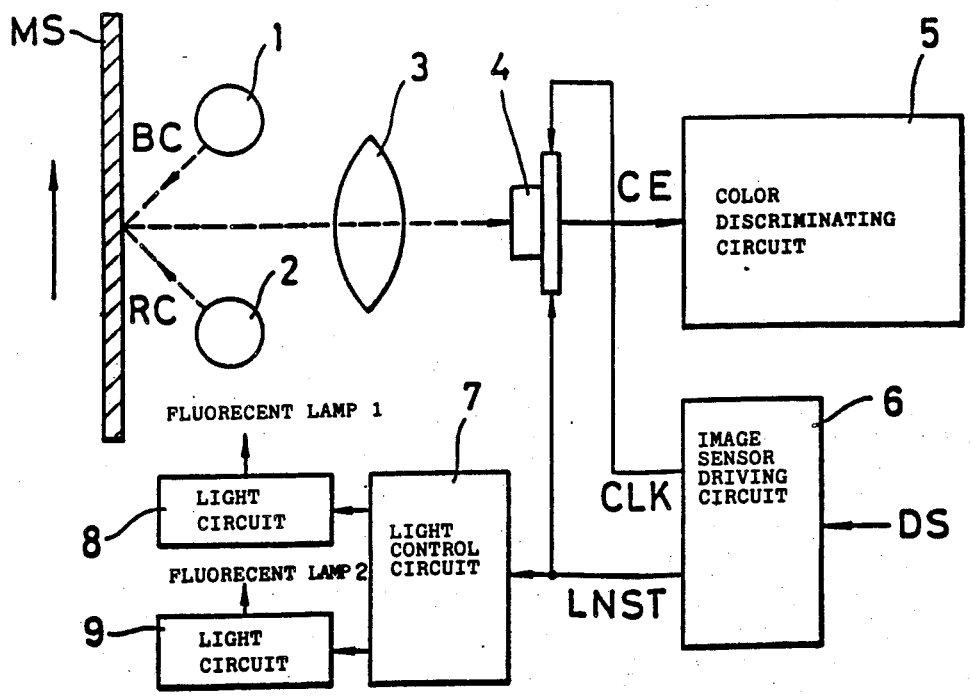
FIG. 4 shows configuration of an embodiment of a color image reading apparatus according to the present invention.
Figure 5:
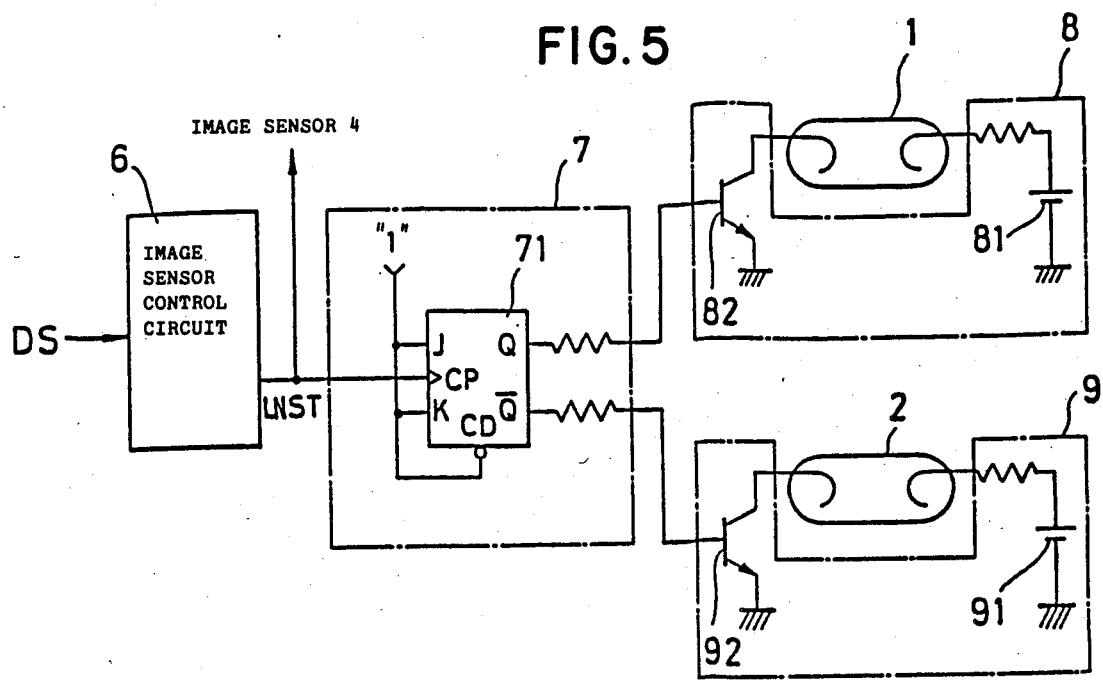
FIG. 5 is a diagram showing a light source driving section of the present invention.

FIG. 4 and FIG. 5 show one embodiment of the color image reading apparatus of this invention. FIG. 4 illustrates the over-all structure of the apparatus, while FIG. 5 shows the configuration of the light source driving section in the embodiment which is a main part of this invention. In both FIG. 4 and FIG. 5, the same devices and circuits as those in FIG. 1, are designated by the same symbols and numerals as in FIG. 1 so that repetition of explanation is eliminated.

As illustrated in FIG. 4 and FIG. 5, a light source driving section comprises a lighting control circuit 7 having J-K flip-flop 71 which inverses the logic level of its Q output and $\overline{Q}$ output each time the scanning start signal LNST instructing to begin read scanning on each line is outputted from an image sensor driving circuit 6, a lighting circuit 8 having a switching transistor 82 which turns "ON" when the logic level of both DC source 81 and Q output of the J-K flip-flop 71 comes to be "1", this lighting circuit 8 causing a blue fluorescent lamp 1 to light when said transistor 82 comes to be in the ON state, and a lighting circuit 9 having a switching transistor 92 which turns "ON" when the logic level of both DC source 91 and $\overline{Q}$ output of the J-K flip-flop 71 comes to be "1", this lighting circuit 9 causing a red fluorescent lamp 2 to light when said transistor 92 is in the ON state. The image sensor driving circuit 6 is constructed with a known circuit which, according to the drive signal DS being at the operatable level from the time when the original read start button (not illustrated) was operated until reading of the whole original MS has completed and at least capable of indicating that said start button was operated as well as that reading of the whole original MS has been completed, supplies to an image sensor 4 a scanning start signal LNST and an image signal clock CLK corresponding to image signal bit in one scanning line, and which thereby controls operation of original read scanning performed by the image sensor 4.

Figure 6:
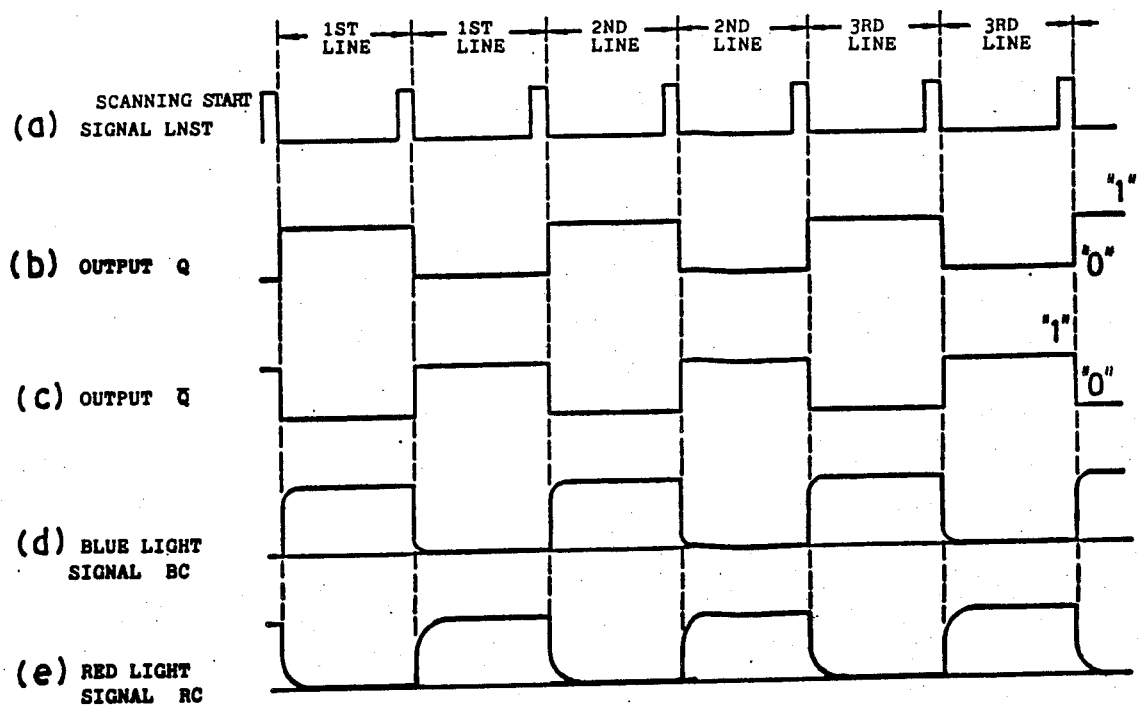
FIG. 6 is a time chart showing operation of the color image reading apparatus of FIG. 4.

Through such arrangement of the light source driving section, when reading the image of the original MS, the blue fluorescent lamp 1 and the red fluorescent lamp 2 can repeat blinking alternately in synchronism with the cycle of read scanning. Referring to FIG. 6, (a) shows the operation of the scanning start signal LNST which is outputted from the image sensor driving circuit 6 and (b) and (c) show the logic operation of Q output and $\overline{Q}$ output of the J-K flip-flop and (d) and (e) show the operation of lighting the blue fluorescent lamp 1 and red fluorescent lamp 2. As illustrated in the timing chart of FIG. 6, Q output and $\overline{Q}$ output of the J-K flip-flop 71 inverse their logic level in synchronism with the scanning start signal LNST. Accordingly, the transistors 82 and 92 come to repeat "ON" and "OFF" operation, alternately, in synchronism with this scanning start signal LNST, and consequently both the blue fluorescent lamp 1 and red fluorescent lamp 2 come to repeat their blinking alternately in synchronism with this scanning start signal LNST, that is, in synchronism with the read scanning cycle for the image sensor 4.

Figure 3:
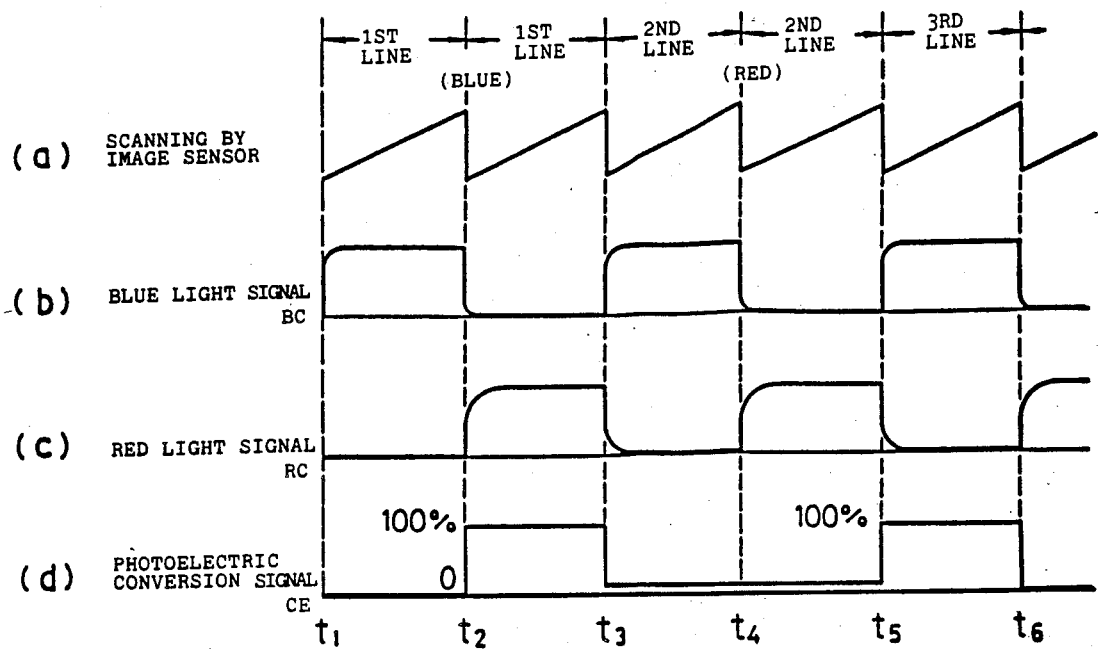
FIG. 3 is a time chart showing operation of the color image reading apparatus of FIG. 1.

Assuming that the 1st line is totally blue and the 2nd line is totally red on the original MS to be scanned for reading, then the photoelectric conversion signal shown in FIG. 3(d) can be obtained.

Incidentally, the red fluorescent lamp 2 which uses magnesium germanate as the fluorescent luminant generally has unsatisfactory response characteristics, and moreover, its after-glow duration is long (about 2 m sec). Accordingly, in actual use, a suitable phase advancing circuit and waveform shaping circuit are provided between the lighting control circuit 7 and the lighting circuit 9, to adjust the rise and fall time of the $\overline{Q}$ output of the J-K flip-flop 71 as illustrated in FIG. 6(c), whereby efficient light radiation can be provided without time loss. In the color image reading apparatus of this invention which uses pulse signals of comparatively long time length as shown in FIGS. 6(b) and (c) as the lighting signals for the fluorescent lamps, such timing adjustment as described above can be easily made.

In this embodiment, the lighting signal is designed to be formed by means of flip-flop, and accordingly the waveform thereof takes the square waveform. However, any waveforms of pulse signal can be adopted for the lighting signal if it remains in active level for the duration corresponding to the duration for original read scanning by the image sensor 4.

Further, in the above embodiment, an apparatus is shown which reads for image in three kinds of colors, blue, red and black and which contains two fluorescent lamps, blue lamp 1 and red lamp 2. However, any light source colors can be selected according to the image colors to be read. Colors normally used other than those mentioned above are cyanic, magenta, and yellow. If green light source besides blue light source and red light source mentioned above are used, multicolored original can be read (discriminated). In such case, multicolor reading can be achieved through such arrangement that the image sensor scans the same line three times and that lighting control is performed so that irradiations of light by a blue light source, by a green light source, and by a red light source are repeated, synchronizing with each scanning cycle of the image sensor. The turn of irradiation by each of these lights is determined optionally unless its cyclic characteristics is impaired. For instance, in the case of the above embodiment, the turn of irradiation may be determined in the order like this:

In the first scanning, the red fluorescent lamp 2 is lighted to produce the red light signal RC and in the second scanning, blue fluorescent lamp is lighted to produce the blue light signal RC.

Furthermore, in the above embodiment, a CCD line sensor is used as the image sensor 4. However, this choice is optional, that is, any kind of sensor is acceptable so far as it is a photoelectric conversion sensor used in an ordinary original reader.

What is claimed is:

1. An apparatus for reading a color image on an original comprising:

a plurality of fluorescent light sources for illuminating a line of image on an original, each of said light sources having a different color spectrum, each light source exhibiting non-uniform light emission under high frequency excitation;

an image sensor for scanning said illuminated line, said line reflecting light from said plurality of light sources, said image sensor producing photoelectric conversion signals corresponding to said reflected light;

means for producing a DC driving signal in synchronism with scanning by said image sensor, said DC driving signal eliminating said non-uniformity of said light sources;

means for supplying said DC driving signal to said light sources; and means for discriminating color images based on said photoelectric conversion signals produced by said image sensor.

2. The apparatus as defined in claim 1 wherein said DC driving signal is a pulse signal which is active throughout the scanning period of said illuminated line by said image sensor.

3. The apparatus as defined in claim 2 wherein said pulse signal is of rectangular shape.

4. The apparatus as defined in claim 2 further comprising means to lead or delay said pulse signal with respect to the scanning period of the image sensor so that said light sources are turned on and off in synchronism with said scanning period.

5. A method for reading a color image on an original, comprising the steps of:

illuminating a line of image on an original with a plurality of fluorescent light sources, each of said light sources having a different color spectrum, each light source exhibiting non-uniform light emission over time during radio frequency excitation, scanning by an image sensor said illuminated line, said line reflecting light from said plurality of light sources, said image sensor producing photoelectric conversion signals corresponding to said reflected light;

producing in synchronization with scanning by said image sensor, a DC driving signal to eliminate said non-uniformity of said light sources;

supplying said DC driving signal to said light sources, and discriminating color images based on said photoelectric conversion signals produced by said image sensor.

6. An apparatus for reading a color image on an original, comprising:

a plurality of fluorescent lamps for irradiating said original, each of said fluorescent lamps having a different spectrum;

an image sensor for receiving reflected light from said original;

means for producing a driving signal in synchronism with scanning of said image sensor and supplying said driving signal to said fluorescent lamps, said driving signal being a pulse signal which is in an active level during a scanning period of said image sensor; and means for discriminating colors of said image based on a plurality of photoelectric conversion signals produced by said image sensor corresponding to reflected light at the original from said plurality of fluorescent lamps.

7. The apparatus as defined in claim 6 wherein said pulse signal is of a rectangular shape.

8. The apparatus as defined in claim 6 wherein said pulse signal is caused to lead or delay with respect to said scanning period of said image sensor so that timing of turning on and off of each of said fluorescent lamps is in synchronism with said scanning period for reading said image.

9. A method for reading a color image on an original comprising the steps of:

irradiating said original by a plurality of fluorescent lamps, each having a different spectrum;

irradiating reflected light from said original on an image sensor;

producing a driving signal, said driving signal being a pulse signal which is in an active level during a scanning period of said image sensor;

producing a plurality of photoelectric conversion signals by said image sensor corresponding to said reflected light; and discriminating colors of said image based on said plurality of photoelectric conversion signals.

* * * * *